(12) United States Patent
Shimoyama et al.

(10) Patent No.: US 7,540,991 B2
(45) Date of Patent: *__Jun. 2, 2009__

(54) ION CONDUCTIVE POLYMER ELECTROLYTE MEMBRANE AND PRODUCTION METHOD FOR THE SAME

(75) Inventors: Naoyuki Shimoyama, Saitama (JP); Fumio Saitoh, Tokyo (JP); Toru Kimura, Funabashi (JP); Masayuki Tobita, Isesaki (JP)

(73) Assignee: Polymatech Co., Ltd., Tokyo (JP)

( * ) Notice: Subject to any disclaimer, the term of this patent is extended or adjusted under 35 U.S.C. 154(b) by 619 days.

This patent is subject to a terminal disclaimer.

(21) Appl. No.: 11/173,721

(22) Filed: Jul. 1, 2005

(65) Prior Publication Data

US 2006/0004112 A1 Jan. 5, 2006

(30) Foreign Application Priority Data

Jul. 5, 2004 (JP) ............................. 2004-198608

(51) Int. Cl.
*H05B 6/00* (2006.01)
(52) U.S. Cl. .................... 264/436; 264/435; 521/27; 429/33
(58) Field of Classification Search ................ 264/108, 264/212, 218, 435, 436; 429/44, 30, 12, 429/303
See application file for complete search history.

(56) References Cited

U.S. PATENT DOCUMENTS

| | | | |
|---|---|---|---|
| 6,187,231 B1 * | 2/2001 | Sansone et al. | ............... 264/41 |
| 6,586,561 B1 | 7/2003 | Litt et al. | ................... 528/353 |
| 2002/0132169 A1 | 9/2002 | Yamamoto et al. | .......... 429/317 |
| 2004/0062969 A1 * | 4/2004 | Sakaguchi et al. | ............ 429/33 |
| 2005/0156356 A1 * | 7/2005 | Saitoh et al. | ................. 264/435 |

FOREIGN PATENT DOCUMENTS

| | | |
|---|---|---|
| EP | 0 948 074 A2 | 10/1999 |
| EP | 1384743 A1 * | 1/2004 |
| EP | 1 416 031 A1 | 5/2004 |
| JP | 05-255522 | 10/1993 |
| JP | 06-251780 | 9/1994 |
| JP | 08-165360 | 6/1996 |
| JP | 2002-533890 | 10/2002 |
| JP | 2003-234015 | 8/2003 |
| JP | 2003-288916 | 10/2003 |
| WO | WO 00/39202 | 7/2000 |

* cited by examiner

*Primary Examiner*—Christina Johnson
*Assistant Examiner*—Galen Hauth
(74) *Attorney, Agent, or Firm*—Occhiuti Rohlicek & Tsao LLP

(57) ABSTRACT

The present invention provides an electrolyte membrane formed of an ion conductive composition. Said composition contains a liquid crystalline polymer having an ionic dissociative group. Molecular chains of the liquid crystalline polymer are orientated in a specific direction. The degree of orientation α of the liquid crystalline polymer is in a range of 0.45 or more and less than 1, as defined by equation (1) as follows, Degree of orientation $\alpha = (180 - \Delta\beta)/180$ (1), wherein $\Delta\beta$ is a full width at half maximum of a peak in an X-ray diffraction intensity distribution pattern obtained by measuring an intensity distribution from 0 to 360 degrees in the azimuthal angle direction, at a peak scattering angle, in an X-ray diffraction image of the electrolyte membrane. Ionic conductivity in a thickness direction of the membrane is higher than the ionic conductivity in a direction parallel to a surface of the membrane. The present invention also provides a method for manufacturing an electrolyte membrane formed of an ion conductive composition.

5 Claims, 4 Drawing Sheets

ION CONDUCTIVE POLYMER ELECTROLYTE MEMBRANE AND PRODUCTION METHOD FOR THE SAME

CROSS-REFERENCE TO RELATED APPLICATION

Under 35 U.S.C. § 119, this application claims the benefit of a foreign priority application filed in Japan, serial number 2004-198608, filed on Jul. 5, 2004.

BACKGROUND OF THE INVENTION

The present invention relates to an ion conductive polymer electrolyte membrane which is used for a solid polymer type fuel cell. Such an ion conductive polymer electrolyte membrane allows permeation of hydrogen ions generated at a fuel electrode (anode) to an air electrode (cathode).

With development of electronic instruments, fuel cells have recently been attracting attention as small portable power sources with high power density. The fuel cells, unlike conventional power generation systems, produce electric energy by electrochemically reacting fuel, such as hydrogen or methanol, with oxygen in air. The fuel cells are classified into, for example, a solid polymer type, a solid oxide type, a molten carbonate type, and a phosphoric acid type, in accordance with types of electrolyte. Of those, a solid polymer type fuel cell has been studied vigorously as a portable power source due to operability at normal temperatures (100° C. or below), a short starting time, and easy reduction in size.

The solid polymer type fuel cell includes a fuel electrode, an air electrode, and a polymer electrolyte membrane such as an ion conductive polymer electrolyte membrane provided therebetween. In the solid polymer type fuel cell, hydrogen as a fuel supplied from a side of the fuel electrode dissociates into hydrogen ions and electrons. Then, the hydrogen ions permeate through the polymer electrolyte membrane, reach the air electrode, and react with oxygen in air, to thereby generate water. Through a series of those reactions, electric energy is produced.

A fluorine-based polymer electrolyte membrane having an acidic group such as perfluorocarbon sulfonic acid introduced thereinto has been used extensively as this type of polymer electrolyte membrane. For example, Japanese Laid-Open Patent Publications No. 05-255522 and No. 06-251780 each disclose a solid polymer type fuel cell employing NAFION (trade name) as perfluorocarbon sulfonic acid. Further, there is proposed an electrolyte membrane having a strong acid group introduced into an aromatic-containing polymer. For example, Japanese National Phase Laid-Open Patent Publication No. 2002-533890 and Japanese Laid-Open Patent Publication No. 2003-288916 each disclose a polymer electrolyte membrane having a strong acid group such as a sulfonic group introduced into a polymer having chemical resistance and thermal resistance such as polysulfone or polybenzimidazole.

Meanwhile, polymer electrolyte membranes having structures disclosed in the following patent documents are known as ion conductive polymer electrolyte membranes having anisotropy, for example. Japanese Laid-Open Patent Publication No. 2003-234015 discloses an ion conductive polymer electrolyte membrane composed of a polymer such as polyacrylic acid having an ionic dissociative group such as a carboxyl group. In this ion conductive polymer electrolyte membrane, said polymer is orientated by applying an electric field thereto. Japanese Laid-Open Patent Publication No. 08-165360 discloses an electrically conductive polymer orientated membrane composed of a conductive polymer derivative such as water-soluble polypyrrole. In the membrane, a conductive polymer derivative is orientated in a thickness direction of the membrane by applying a magnetic field thereto.

However, perfluorocarbon sulfonic acid used in each of Japanese Laid-Open Patent Publications No. 05-255522 and No. 06-251780 has a low glass transition temperature and barely retains moisture at about 100° C., which is an upper limit for the operation temperature of the solid polymer type fuel cell. Thus, sufficient ionic conductivity cannot be exhibited. Further, the polymers used in each of Japanese National Phase Laid-Open Patent Publication No. 2002-533890 and Japanese Laid-Open Patent Publication No. 2003-288916 have stiff molecular chains that are not controlled with respect to their orientation. Thus, sufficient ionic conductivity cannot be exhibited in a thickness direction of the polymer electrolyte membrane.

The ion conductive polymer electrolyte membrane disclosed in Japanese Laid-Open Patent Publication No. 2003-234015 has large pores each with a pore size of around 10 μm or more, to thereby cause a so-called crossover phenomenon. Thus, a fuel may be lost due to the crossover phenomenon during power generation to reduce power generation capacity, or a side reaction with air may significantly reduce the power generation capacity. Furthermore, the ion conductive polymer electrolyte membrane has low thermal resistance due to denaturation of the polymer at the upper limit of operation temperature. Thus, the ion conductive polymer electrolyte membrane is not suitable for the solid polymer type fuel cell.

The electrically conductive polymer orientated membrane disclosed in Japanese Laid-Open Patent Publication No. 08-165360 is aimed at arbitrary control of the direction of electron conduction. In this membrane, electrons together with hydrogen ions permeate through the membrane, to provide substantially no voltage difference between a fuel electrode and an air electrode. Thus, the electrically conductive polymer orientated membrane is not suitable for the solid polymer type fuel cell.

The present invention has been made in view of the problems present in conventional technology. An objective of the present invention is therefore to provide an ion conductive polymer electrolyte membrane which has excellent thermal resistance and high ionic conductivity in a thickness direction, and thus which is suitable for a solid polymer type fuel cell. Another objective of the present invention is to provide a production method for an ion conductive polymer electrolyte membrane allowing easy production of the ion conductive polymer electrolyte membrane.

BRIEF SUMMARY OF THE INVENTION

The present invention provides an electrolyte membrane comprising an ion conductive composition from which a membrane is formed. Said composition containing a liquid crystalline polymer having an ionic dissociative group and molecular chains orientated in a specific direction. The liquid crystalline polymer including a degree of orientation $\alpha$ in a range of 0.45 or more and less than 1, as defined by equation (1) as follows, $$\text{Degree of orientation } \alpha = (180 - \Delta\beta)/180 \tag{1}$$

wherein $\Delta\beta$ is a full width at half maximum of a peak in an X-ray diffraction intensity distribution pattern obtained by measuring an intensity distribution from 0 to 360 degrees in the azimuthal angle direction, at a peak scattering angle, in an X-ray diffraction image of the electrolyte membrane. Ionic conductivity in a thickness direction of the membrane is higher than the ionic conductivity in a direction parallel to a surface of the membrane.

The present invention also provides a method for manufacturing an electrolyte membrane formed of an ion conductive composition. The method comprising preparing the ion conductive composition containing a liquid crystalline polymer having an ionic dissociative group and molecular chains; developing liquid crystallinity of the liquid crystalline polymer in the composition; orientating the molecular chains of the liquid crystalline polymer having developed liquid crystallinity in a specific direction; and solidifying the ion conductive composition while the orientation of the molecular chains of the liquid crystalline polymer is maintained.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Hereinafter, detailed description is given of an ion conductive polymer electrolyte membrane (hereinafter, simply referred to as electrolyte membrane), which is a concrete form of the present invention.

Figure 1:
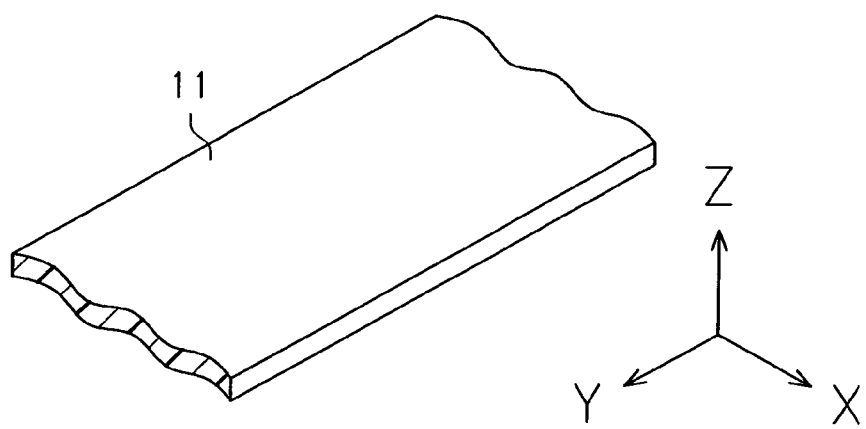
FIG. 1 is a perspective view showing a main part of an electrolyte membrane according to an embodiment of the present invention.

As shown in FIG. 1, an electrolyte membrane 11 according to an embodiment of the present invention is formed from an ion conductive composition into a sheet having a thickness of 20 to 30 μm, for example. The electrolyte membrane 11 is disposed between a fuel electrode and an air electrode of a solid polymer type fuel cell. The electrolyte membrane 11 allows permeation of hydrogen ions generated at the fuel electrode to the air electrode.

The electrolyte membrane 11 has thermal resistance and ion conduction properties. The thermal resistance is an indicator showing stability of the electrolyte membrane 11 and depends on thermal resistance of a liquid crystalline polymer in the composition. The ion conduction property is an indicator showing permeation ease of hydrogen ions and varies depending on an ionic conductivity of the electrolyte membrane 11. The electrolyte membrane 11 with a higher ionic conductivity allows easier permeation of hydrogen ions, to thereby provide an excellent ion conduction property. The hydrogen ions generally permeate through the electrolyte membrane 11 in the thickness direction (Z-axis direction of FIG. 1) thereof. Thus, the electrolyte membrane 11 is configured to have better ion conduction property in the thickness direction of the membrane than ionic conductivity in an X-axis direction or Y-axis direction parallel to the surface of the membrane. The direction parallel to the surface of the membrane, such as the X-axis direction, is perpendicular to the thickness direction of the membrane. The electrolyte membrane 11, having smaller pores formed through the membrane, suppresses permeation of fuel or the like in a solid polymer type fuel cell through the pores, to thereby allow selective permeation of hydrogen ions alone. This can enhance the power generation efficiency of such a solid polymer type fuel cell.

The ion conductive composition (hereinafter, simply referred to as "composition") contains a liquid crystalline polymer having ionic dissociative groups. The liquid crystalline polymer having ionic dissociative groups is composed of the ionic dissociative group and a liquid crystalline polymer having a site being capable developing liquid crystallinity in a main chain or side chains. The ionic dissociative group presumably bonds with hydrogen ions or dissociates the bonded hydrogen ions in a polar solvent. The ionic dissociative group is bonded to the main chain or side chain of the liquid crystalline polymer through a covalent bond.

Examples of the ionic dissociative group include a proton acid group and a basic group, however the proton acid group is preferable because of a good function for increasing ionic conductivity of the electrolyte membrane 11. Examples of the proton acid group include a sulfonic acid group, a phosphonic acid group, a carboxylic acid group, and a salt such as an alkali earth metal salt thereof. One type of proton acid group may be bonded to the main chain or side chain of the liquid crystalline polymer, or two or more types thereof may be bonded to the main chain or side chain. Of those, the sulfonic acid group or the phosphonic acid group are preferable because of their better function for increasing ionic conductivity of the electrolyte membrane 11, and the sulfonic acid group is more preferable. Examples of the basic group include a polar group such as a primary or secondary amino group, and a salt such as an alkali earth metal salt thereof or an ammonium salt.

The ionic dissociative group may be introduced into the main chain or side chains of the liquid crystalline polymer by synthesizing a liquid crystal monomer having, for example, a sulfonic group as an ionic dissociative group, and polymerizing the liquid crystal monomers. The proton acid group may be bonded to the main chain or side chains of the liquid crystalline polymer by preparing a composition having a liquid crystalline polymer dispersed into a proton acid liquid that is a strong acid, and forming the composition into a membrane. Alternatively, the proton acid group may be bonded to the main chain or side chain of the liquid crystalline polymer by forming the electrolyte membrane 11 from a composition containing a liquid crystalline polymer having no ionic dissociative group, and immersing the electrolyte membrane 11 in a proton acid liquid. The ionic dissociative group may be bonded to the main chain or side chain of the liquid crystalline polymer through a linker. Examples of the linker include alkylene, alkylene ether, alkylene ether ketone, arylene, arylene ether, and arylene ether ketone. One type of linker may be used, or two or more types thereof may be used in combination. In addition, the linker may be fluorinated.

A method of bonding an ionic dissociative group to a main chain or side chains of a liquid crystalline polymer through a linker involves formation of a sodium or potassium salt of a phenolic hydroxyl group produced through irradiation of a radiation such as an electron beam or a chemical reaction, and alkylene etherification of the salt with sultone. Another method thereof involves reaction of the sodium salt with halogenated alkenyl through a Williamson reaction or the like, and sulfonation of the resultant. For example, in a case where a main chain of a liquid crystalline polymer is imidazole, the main chain of the liquid crystalline polymer can be sulfonated through dehydrogenation of the main chain by using a reducing agent such as lithium hydride, and reaction of the resultant with sultone.

The number of ionic dissociative groups per structural unit (repeating unit) of the liquid crystalline polymer having ionic dissociative groups is preferably 0.1 or more, more preferably 0.5 or more. If the number of ionic dissociative groups is less than 0.1, the electrolyte membrane 11 has a low ionic conductivity and cannot exhibit a sufficient ion conduction property.

The liquid crystalline polymer refers to a polymer exhibiting optical anisotropy due to regularly arranged molecular chains in a liquid crystal state. The molecular chain of the liquid crystalline polymer refers to a main chain or side chains having a liquid crystalline site, which is a moiety being capable of developing liquid crystallinity. The liquid crystalline polymer may have a liquid crystalline site in either of the main chain or the side chain, or in both of them. The liquid crystalline polymer may be fluorinated. Fluorinated liquid crystalline polymer has a fluorine atom introduced into the main chain or side chain thereof. The liquid crystalline polymer preferably excels in thermal resistance and chemical resistance. Excellent chemical resistance refers to a property in which a structure of the liquid crystalline polymer does not change when the electrolyte membrane 11 is brought into contact with chemicals. Chemical resistance includes acid resistance, alkali resistance, and the like. However, the electrolyte membrane 11 is often used in an acidic atmosphere, and thus the electrolyte membrane 11 particularly preferably has excellent acid resistance.

The optical anisotropy of the liquid crystalline polymer can be confirmed by strong birefringence specific to liquid crystal in a normal polarization test using an orthogonal polarizer. Examples of the liquid crystalline polymer include a thermotropic liquid crystalline polymer and a lyotropic liquid crystalline polymer.

The thermotropic liquid crystalline polymer refers to a liquid crystalline polymer exhibiting an optical anisotropic molten phase in a predetermined temperature range. The thermotropic liquid crystalline polymer is classified into a main chain type, a side chain type, and a composite type. A main chain type of thermotropic liquid crystalline polymer has in a main chain a mesogenic group having a stiff molecular structure which develops liquid crystallinity. A side chain type of thermotropic liquid crystalline polymer has the mesogenic group in a side chain. More specifically, the side chain type of thermotropic liquid crystalline polymer has, as a repeating unit, a structure including a hydrocarbon-based or siloxane-based main chain and mesogenic groups as side chains bonding to the main chain. A composite type thermotropic liquid crystalline polymer includes a main chain type and a side chain type of thermotropic liquid crystalline polymers in combination.

Examples of the thermotropic liquid crystalline polymer include thermotropic liquid crystal polyester, thermotropic liquid crystal polyimide, thermotropic liquid crystalline polyamide, thermotropic liquid crystalline polyesteramide, thermotropic liquid crystalline polyester ether, thermotropic liquid crystalline polyester carbonate, thermotropic liquid crystalline polyesterimide, thermotropic liquid crystalline polyetherimide, thermotropic liquid crystalline polythioether, thermotropic liquid crystalline polyether, thermotropic liquid crystalline polythiol, thermotropic liquid crystalline polyketone, thermotropic liquid crystalline polysulfone, thermotropic liquid crystalline polybenzoxazole, thermotropic liquid crystalline polybenzimidazole, and thermotropic liquid crystalline polybenzothiazole. One type of these thermotropic liquid crystalline polymers may form a liquid crystalline polymer, or two or more types thereof may be bonded together to form a liquid crystalline polymer.

Components of the thermotropic liquid crystalline polyester generally include: (a) at least one compound selected from aromatic dicarboxylic acid-based compounds and alicyclic dicarboxylic acid-based compounds; (b) at least one compound selected from aromatic hydroxycarboxylic acid-based compounds; (c) at least one compound selected from aromatic diol-based compounds, alicyclic diol-based compounds, and aliphatic diol-based compounds; (d) at least one compound selected from aromatic dithiol-based compounds, aromatic thiophenol-based compounds, and aromatic thiolcarboxylic acid-based compounds; (e) at least one compound selected from aromatic hydroxyamine-based compounds and aromatic diamine-based compounds; (f) at least one compound selected from aromatic hydroxyaldehyde-based compounds; and (g) at least one compound selected from aromatic dialdehyde-based compounds. The thermotropic liquid crystalline polyester may be composed of any one of components (a) to (f), but is preferably composed of a combination of components (a) to (g).

Examples of the aromatic dicarboxylic acid-based compounds include aromatic dicarboxylic acid and derivatives thereof. Examples of the aromatic dicarboxylic acid include: terephthalic acid; 4,4'-diphenyldicarboxylic acid; 4,4'-triphenyldicarboxylic acid; 2,6-naphthalenedicarboxylic acid; 1,4-naphthalenedicarboxylic acid; 2,7-naphthalenedicarboxylic acid; diphenylether-4,4'-dicarboxylic acid; diphenoxyethane-4-4'-dicarboxylic acid; diphenoxybutane-4,4'-dicarboxylic acid; diphenylethane-4,4'-dicarboxylic acid; isophthalic acid; diphenylether-3,3'-dicarboxylic acid; diphenoxyethane-3,3'-dicarboxylic acid; diphenylethane-3,3'-dicarboxylic acid; 1,6-naphthalenedicarboxylic acid; and sulfonates thereof. The aromatic dicarboxylic acid derivative refers to aromatic dicarboxylic acid having a substituent such as an alkyl group, an alkoxy group, or a halogen group introduced thereinto. Specific examples of the aromatic dicarboxylic acid derivative include: fluoroterephthalic acid; difluoroterephthalic acid; bromoterephthalic acid; methylterephthalic acid; dimethylterephthalic acid; ethylterephthalic acid; methoxyterephthalic acid; ethoxyterephthalic acid; and sulfonates thereof.

Examples of the alicyclic dicarboxylic acid-based compounds include alicyclic dicarboxylic acid and derivatives thereof. Examples of the alicyclic dicarboxylic acid include: trans-1,4-cyclohexanedicarboxylic acid; cis-1,4-cyclohexanedicarboxylic acid; and 1,3-cyclohexanedicarboxylic acid. The alicyclic dicarboxylic acid derivative refers to alicyclic dicarboxylic acid having the above-mentioned substituent introduced thereinto. Specific examples of the alicyclic dicarboxylic acid derivative include: trans-1,4-(2-methyl)cyclohexanedicarboxylic acid; and trans-1,4-(2-chloro)cyclohexanedicarboxylic acid.

Examples of the aromatic hydroxycarboxylic acid-based compounds include aromatic hydroxycarboxylic acid and derivatives thereof. Examples of the aromatic hydroxycarboxylic acid include: 4-hydroxybenzoic acid; 3-hydroxybenzoic acid; 6-hydroxy-2-naphthoic acid; 6-hydroxy-1-naphthoic acid; and sulfonates thereof. The aromatic hydroxycarboxylic acid derivative refers to aromatic hydroxycarboxylic acid having the above-mentioned substituent introduced thereinto. Specific examples of the aromatic hydroxycarboxylic acid derivative include: 3-methyl- 4-hydroxybenzoic acid; 3,5-dimethyl-4-hydroxybenzoic acid; 2,6-dimethyl-4-hydroxybenzoic acid; 3-methoxy-4-hydroxybenzoic acid; 3,5-dimethoxy-4-hydroxybenzoic acid; 6-hydroxy-5-methyl-2-naphthoic acid; 6-hydroxy-5-methoxy-2-naphthoic acid; 2-fluoro-4-hydroxybenzoic acid; 3-fluoro-4-hydroxybenzoic acid; 2,3-difluoro-4-hydroxybenzoic acid; 3,5-difluoro-4-hydroxybenzoic acid; 2,5-difluoro-4-hydroxybenzoic acid; 3-bromo-4-hydroxybenozic acid; 6-hydroxy-5-fluoro-2-naphthoic acid; 6-hydroxy-7-fluoro-2-naphthoic acid; 6-hydroxy-5,7-difluoro-2-naphthoic acid; and sulfonates thereof.

Examples of the aromatic diol-based compound include aromatic diol and derivatives thereof. Examples of the aromatic diol include: 4,4'-dihydroxydiphenyl; 3,3'-dihydroxydiphenyl; 4,4'-dihydroxytriphenyl; hydroquinone; resorcin; 2,6-naphthalenediol; 4,4'-dihyroxydiphenylether; bis(4-hydroxyphenoxy)ethane; 3,3'-dihydroxydiphenylether; 1,6-naphthalenediol; 2,2-bis(4-hydroxyphenyl)propane; bis(4-hydroxyphenyl)methane; and sulfonates thereof. The aromatic diol derivative refers to aromatic diol having the above-mentioned substituent introduced thereinto. Specific examples of the aromatic diol derivative include: fluorohydroquinone; methylhydroquinone; t-butylhydroquinone; phenylhydroquinone; methoxyhydroquinone; phenoxyhydroquinone; 4-fluororesorcin; 4-methylresorcin; and sulfonates thereof.

Examples of the alicyclic diol-based compounds include alicyclic diol and derivatives thereof. Examples of the alicyclic diol include: trans-1,4-cyclohexanediol; cis-1,4-cyclohexanediol; trans-1,4-cyclohexanedimethanol; cis-1,4-cyclohexanedimethanol; trans-1,3-cyclohexanediol; cis-1,2-cyclohexanediol; and trans-1,3-cyclohexanedimethanol. The alicyclic diol derivative refers to alicyclic diol having the above-mentioned substituent introduced thereinto. Specific examples of the alicyclic diol derivative include: trans-1,4-(2-methyl)cyclohexanediol; and trans-1,4-(2-fluoro)cyclohexanediol.

Examples of the aliphatic diol-based compounds include straight chain or branched aliphatic diols such as ethylene glycol, 1,3-propanediol, 1,4-butanediol, and neopentyl glycol. Examples of the aromatic dithiol-based compounds include: benzene-1,4-dithiol; benzene-1,3-dithiol; 2,6-naphthalenedithiol; and 2,7-naphthalenedithiol. Examples of the aromatic thiophenol-based compounds include: 4-mercaptophenol; 3-mercaptophenol; 6-mercaptophenol; and sulfonates thereof. Examples of the aromatic thiolcarboxylic acid-based compounds include: 4-mercaptobenzoic acid; 3-mercaptobenzoic acid; 6-mercapto-2-naphthoic acid; 7-mercapto-2-naphthoic acid; and sulfonates thereof.

Examples of the aromatic hydroxyamine-based compounds include: 4-aminophenol; N-methyl-4-aminophenol; 3-aminophenol; 3-methyl-4-aminophenol; 2-fluoro-4-aminophenol; 4-amino-1-naphthol; 4-amino-4'-hydroxydiphenyl; 4-amino-4'-hydroxydiphenylether; 4-amino-4'-hydroxydiphenylmethane; 4-amino-4'-hydroxydiphenylsulfide; 4,4'-ethylenedianiline; and sulfonates thereof.

Examples of the aromatic diamine-based compounds include: 1,4-phenylenediamine; N-methyl-1,4-phenylenediamine; N,N'-dimethyl-1,4-phenylenediamine; 4,4'-diaminophenylsulfide (thiodianiline); 4,4'-diaminodiphenylsulfone; 2,5-diaminotoluene; 4,4'-diaminodiphenoxyethane; 4,4'-diaminodiphenylmethane (methylenedianiline); 4,4'-diaminodiphenylether (oxydianiline); and sulfonates thereof.

Examples of the aromatic hydroxyaldehyde-based compounds include aromatic hydroxyaldehyde and derivatives thereof. Examples of the aromatic hydroxyaldehyde include: p-hydroxybenzaldehyde; o-hydroxybenzaldehyde; 6-hydroxy-2-naphthaldehyde; 6-hydroxy-1-naphthaldehyde; and sulfonates thereof. The aromatic hydroxyaldehyde derivative refers to aromatic hydroxyaldehyde having the above-mentioned substituent introduced thereinto. Specific examples of the aromatic hydroxyaldehyde derivative include: 3-methyl-4-hydroxybenzoic acid; 3,5-dimethyl-4-hydroxybenzaldehyde; 2,6-dimethyl-4-hydroxybenzaldehyde; 3-methoxy-4-hydroxybenzaldehyde; 3,5-dimethoxy-4-hydroxybenzaldehyde; 6-hydroxy-5-methyl-2-naphthaldehyde; 6-hydroxy-5-methoxy-2-naphthaldehyde; 2-fluoro-4-hydroxybenzaldehyde; 3-fluoro-4-hydroxybenzaldehyde; 2,3-difluoro-4-hydroxybenzaldehyde; 3,5-difluoro-4-hydroxybenzaldehyde; 2,5-difluoro-4-hydroxybenzaldehyde; 3-bromo-4-hydroxybenzaldehyde; 6-hydroxy-5-fluoro-2-naphthaldehyde; 6-hydroxy-7-fluoro-2-naphthaldehyde; 6-hydroxy-5,7-difluoro-2-naphthaldehyde; and sulfonates thereof.

Examples of the aromatic dialdehyde-based compounds include aromatic dialdehyde and derivatives thereof. Examples of the aromatic dialdehyde include: terephthalaldehyde; 2,6-naphthalenedialdehyde; 1,4-naphthalenedialdehyde; 2,7-naphthalenedialdehyde; 1,5-naphthalenedialdehyde; 4,4'-diphenyldialdehyde; 4,4'-triphenyldialdehyde; diphenylether-4,4'-dialdehyde; diphenoxyethane-4,4'-dialdehyde; diphenoxybutane-4,4'-dialdehyde; diphenylethane-4,4'-dialdehyde; isophthaldehyde; diphenylether-3,3'-dialdehyde; diphenoxyethane-3,3'-dialdehyde; diphenylethane-3,3'-dialdehyde; 1,6-naphthalenedialdehyde; and sulfonates thereof. The aromatic dialdehyde derivative refers to aromatic dialdehyde having the above-mentioned substituent introduced thereinto. Specific examples of the aromatic dialdehyde derivative include: fluoroterephthaldialdehyde; difluoroterephthaldialdehyde; bromoterephthaldialdehyde; methylterephthaldialdehyde; dimethylterephthaldialdehyde; ethylterephthaldialdehyde; methoxyterephthaldialdehyde; and ethoxyterephthaldialdehyde.

Examples of the thermotropic liquid crystalline polyesteramide include: aromatic diamine; aromatic dicarboxylic acid; aromatic diol; aromatic aminocarboxylic acid; aromatic oxycarboxylic acid; aromatic oxyamino compounds; derivatives thereof; and arbitrary mixtures thereof.

The lyotropic liquid crystalline polymer is dissolved in a solvent and converts into a liquid crystal state exhibiting optical anisotropy. The solvent is not particularly limited as long as the lyotropic liquid crystalline polymer is converted into a liquid crystal state when the polymer is dissolved therein. Specific examples of the solvent include: aprotic solvents such as N,N-dimethylacetamide, N,N-dimethylformamide, dimethylsulfoxide, N-methyl-2-pyrrolidone, pyridine, quinoline, triethylamine, ethylenediamine, and hexamethylphosphonamide; and protic solvents such as trifluoromethanesulfonic acid, trifluoroacetic acid, methanesulfonic acid, polyphosphoric acid, and sulfuric acid. One type of solvent may be used, or two or more types thereof may be used in combination. In a case where two or more types of solvents are used in combination, an acidic solvent and a basic solvent are preferably not used in combination to avoid a reaction between the solvents. Further, the solvent may contain a Lewis acid catalyst or the like added thereto, to thereby enhance solubility of the lyotropic liquid crystalline polymer.

Examples of the lyotropic liquid crystalline polymer include: a lyotropic liquid crystalline polymer of main chain type such as polybenzazole, polyimide, polyparaphenylene terephthalamide, polymetaphenylene isophthalamide, a copolymer thereof, or a polyarylene polymer having a mesogenic group; and a lyotropic liquid crystalline polymer of side chain type. In the side chain type, a lipophilic (hydrophobic) polymer chain has side chains that are mesogenic groups and any hydrophilic groups, or mesogenic groups having any hydrophilic groups bonded to the terminals thereof. Of those, polybenzazole and polyimide are preferable because of excellent chemical resistance, in addition to excellent thermal resistance.

Polybenzazole refers to a polymer composed of at least one selected from polybenzoxazole, polybenzimidazole, and polybenzothiazole. Polybenzimidazole refers to a polymer composed of a repeating unit having at least one imidazole ring bonded to an aromatic group such as poly(phenylenebenzimidazole). Polybenzoxazole refers to a polymer composed of a repeating unit having at least one oxazole ring bonded to an aromatic group such as poly(phenylenebenzobisoxazole). Polybenzothiazole refers to a polymer composed of a repeating unit having at least one thiazole ring bonded to an aromatic group such as poly(phenylenebenzobisthiazole).

Examples of the repeating unit of polybenzazole having an ionic dissociative group include those represented by the following general formulas (2) to (7). In the following general formulas (2) to (7): $Ar^1$ to $Ar^6$ each represent an aromatic hydrocarbon group; $X^1$ to $X^4$ each represent a sulfur atom, an oxygen atom, or an imino group; Z represents an ionic dissociative group or a salt thereof; and k represents an integer of 1 to 10.

group. The plurality of aromatic rings or aromatic heterocyclic rings are preferably bonded together at a para-position such that a main chain of polybenzazole is in a straight chain for easy control of orientation. Table 1 shows specific examples of aromatic hydrocarbon group represented by $Ar^1$ or $Ar^4$. Table 2 shows specific examples of aromatic hydrocarbon group represented by $Ar^2$ or $Ar^5$. Table 3 shows specific examples of aromatic hydrocarbon group represented by $Ar^3$ or $Ar^6$. Note that, in a case where each aromatic hydrocarbon group of Table 2 represents $Ar^2$ and in a case where each aromatic hydrocarbon group of Table 3 represents $Ar^3$, a hydrogen atom bonded to at least one carbon atom of benzene rings of the aromatic hydrocarbon group is substituted with an ionic dissociative group.

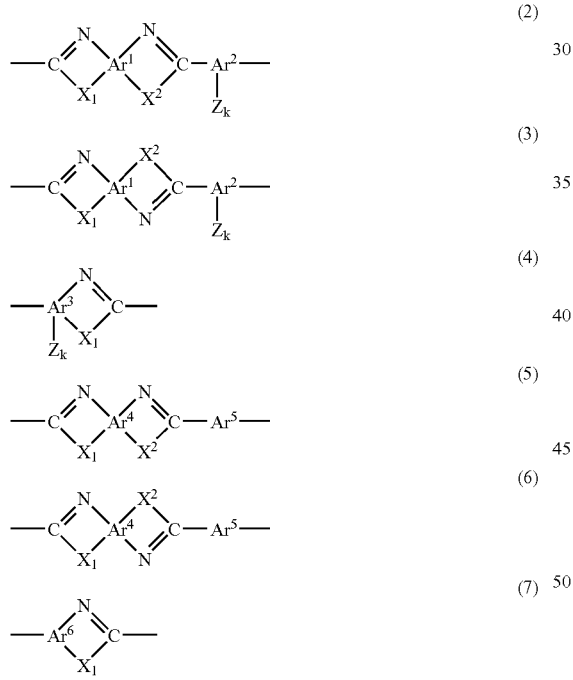

TABLE 1

Examples of aromatic hydrocarbon group represented by $Ar^1$ or $Ar^4$

In the general formulas, the aromatic hydrocarbon groups represented by $Ar^1$ to $Ar^6$ may be independently composed of: one aromatic ring or aromatic heterocyclic ring; or a plurality of aromatic rings or aromatic heterocyclic rings which are bonded together directly or through a functional group containing a hetero atom such as a sulfur atom, an oxygen atom, or a nitrogen atom. In the aromatic hydrocarbon group, a hydrogen atom bonded to at least one carbon atom of benzene rings forming the aromatic hydrocarbon group may be substituted with an alkyl group having 1 to 10 carbon atoms such as methyl, ethyl, or butyl group (t-butyl group, for example) or with an aromatic hydrocarbon group such as a phenyl TABLE 1-continued Examples of aromatic hydrocarbon group represented by Ar¹ or Ar⁴

TABLE 2

Examples of aromatic hydrocarbon group represented by Ar² or Ar⁵

TABLE 2-continued

Examples of aromatic hydrocarbon group represented by Ar² or Ar⁵

TABLE 3

Examples of aromatic hydrocarbon group represented by Ar³ or Ar⁶

TABLE 3-continued

Examples of aromatic hydrocarbon group represented by $Ar^3$ or $Ar^6$

[Chemical structures shown: biphenyl; diphenyl sulfone variants; diphenyl-C(CF$_3$)$_2$ variants]

Polybenzazole may be composed of the repeating unit represented by at least one of the general formulas (2), (3), and (4). Alternatively, polybenzazole may be composed of a combination of the repeating unit represented by at least one of the general formulas (2), (3), and (4), and the repeating unit represented by at least one of the general formulas (5), (6), and (7). The repeating units represented by the general formulas (2) to (7) may be polymerized through random polymerization or block polymerization. In these cases, a degree of polymerization of the repeating unit represented by the above general formula (2), (3), or (4) (hereinafter, referred to as "degree of polymerization M), and a degree of polymerization of the repeating unit represented by the above general formula (5), (6), or (7) (hereinafter, referred to as "degree of polymerization N") are each preferably 1 to 600.

In a case where polybenzazole is composed of a combination of the repeating unit represented by at least one of the general formulas (2), (3), and (4), and the repeating unit represented by at least one of the general formulas (5), (6), and (7), the degree of polymerization M is preferably larger than the degree of polymerization N. Further, the total of the degrees of polymerization M and N preferably falls within a range of 10 and more and less than 600.

When the liquid crystalline polymer contains a basic polymer as a main chain and an acidic group as a side chain, the basic polymers are linked through at least one of a monomer and a oligomer having an active terminal which reacts with a basic group included in the basic polymer. The monomer and/or the oligomer bond with the basic groups of the basic polymers through a covalent bond. Further, molecular chains of the liquid crystalline polymer may be bonded together through a graft polymerization by irradiating radioactive rays or an electron beam on the liquid crystalline polymer to generate radical species. In addition, if the main chain of the liquid crystalline polymer includes a polar group such as a hydroxyl group, a carboxylic group, or a primary or secondary amino group, the polar group may react with carbocations having activated alkylene or arylene terminals, to thereby crosslink together the main chains of the liquid crystalline polymer.

The composition may further include a basic polymer, a basic inorganic compound, a crosslinking agent, or the like for improving strength of the electrolyte membrane 11 or for suppressing swelling thereof. This basic polymer preferably has a primary or secondary amino group in its repeating unit. Examples of the basic polymer having a primary or secondary amino group in its repeating unit include: polybenzimidazole; polyimidazole; polyvinylimidazole; polybenzobisimidazole; and a copolymer of two or more components selected from polyquinoxaline, polyquinoline, polyvinylamine, and poly (4-vinylpyridine). The basic polymer preferably has the ionic dissociative group for enhancing the ion conduction property of the electrolyte membrane 11.

A known material may be used as the basic inorganic compound, and specific examples thereof include hydrotalcite, aluminum hydroxide gel, magnesium oxide, alkaline silicate, and zinc oxide. These inorganic compound may be subjected to surface treatment for enhancing dispersibility in the composition.

The electrolyte membrane 11 is formed of the composition and thus contains a liquid crystalline polymer. The electrolyte membrane 11 has molecular chains of the liquid crystalline polymer orientated in a specific direction, and thus is enhanced in ion conduction in a thickness direction of the electrolyte membrane 11. Such an enhancement of ion conduction is probably brought by that the ionic dissociative groups of the electrolyte membrane 11 are regularly arranged in a specific direction due to the orientation of the molecular chains of the liquid crystalline polymer. The molecular chains of the liquid crystalline polymer are preferably orientated in a specific direction such that the ionic dissociative groups of the polymer are arranged in the thickness direction of the electrolyte membrane 11. For example, in a case where an ionic dissociative group is bonded to a main chain of a liquid crystalline polymer, the main chain of the liquid crystalline polymer is preferably orientated to extend in a thickness direction of the electrolyte membrane 11.

A degree of orientation α of the molecular chains of the liquid crystalline polymer in a specific direction is determined from the following equation (1) in an X-ray diffraction analysis of the electrolyte membrane 11:

$$\text{Degree of orientation } \alpha = (180 - \Delta\beta)/180 \tag{1}$$

wherein $\Delta\beta$ represents a full width at half maximum of the peak in an X-ray diffraction intensity distribution pattern in an azimuthal angle direction obtained by measuring an intensity distribution from 0 to 360 degrees in the azimuthal angle direction, at a peak scattering angle, in an X-ray diffraction image of the electrolyte membrane 11.

The degree of orientation α is in a range of 0.45 or more and less than 1. If the degree of orientation α is less than 0.45, an ionic conductivity of the electrolyte membrane 11 in the specific direction reduces, to thereby degrade the ion conduction in the same direction. Meanwhile, the degree of orientation α is never 1 or more because a full width at half maximum $\Delta\beta$ is always a positive value in the equation (1).

Here, detailed description is given for determining the orientation α of the liquid crystalline polymer.

Figure 2:
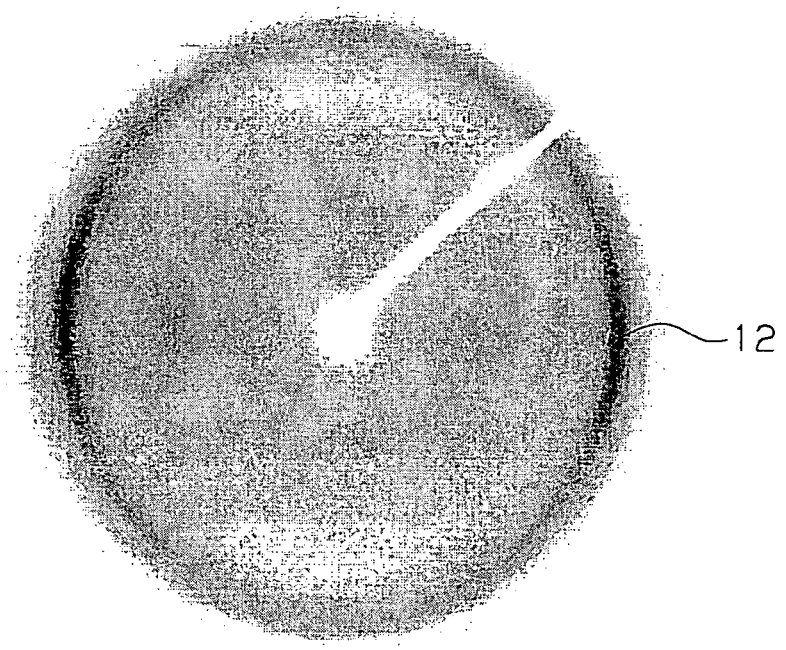
FIG. 2 is a diagram showing a Debye ring.

In order to determine the degree of orientation α of the liquid crystalline polymer, the electrolyte membrane 11 is subjected to wide angle X-ray diffraction measurement (transmission). In an X-ray diffractometer, a sample containing orientated particles (molecular chains) provides a diffraction image of a concentric arc (Debye ring) through irradiation of the sample with X-rays. In order to determine the degree of orientation α of the liquid crystalline polymer in a thickness direction of the electrolyte membrane 11, for example, a plurality of electrolyte membranes 11 are laminated, and then the resulting laminate of electrolyte membranes 11 is cut in a thickness direction to provide a cut surface extending in a thickness direction. Then, as shown in FIG. 2, the cut surface is irradiated with X-rays to obtain a Debye ring 12. Here, a direction of X-ray irradiation is perpendicular to the cut surface. Next, a diffraction pattern showing an X-ray diffraction intensity distribution of the sample in a radial direction from a center of the Debye ring 12 is obtained.

Figure 3:
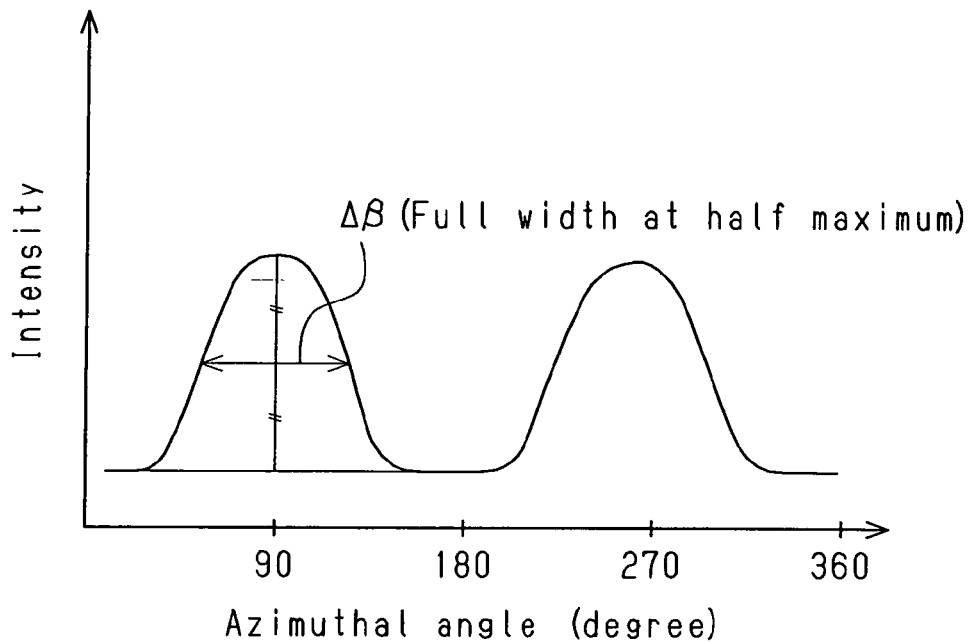
FIG. 3 is a graph showing an X-ray diffraction intensity distribution in a direction of azimuthal angle.

Next, an angle $2\theta$ (hereinafter, referred to as peak scattering angle) with highest intensity within a range of $2\theta=15$ to $30°$ in the diffraction pattern is determined. The peak scattering angle appears at $26°$, for example. While fixing the measurement angle in the radial direction at the peak scattering angle, an X-ray diffraction intensity distribution is then measured in the direction of azimuthal angle (circumferential direction of the Debye ring 12) from $0°$ to $360°$ in the diffraction image, to provide an X-ray diffraction intensity distribution in the direction of azimuthal angle as shown in FIG. 3.

The width of the peak at half height (full width at half maximum $\Delta\beta$) is determined from the intensity distribution in the direction of azimuthal angle. Then the full width at half maximum $\Delta\beta$ is substituted into the above equation (1) to obtain the degree of orientation α. In the X-ray diffraction intensity distribution in a direction of azimuthal angle as shown in FIG. 3, an degree of orientation α is 0.57.

Ionic conductivity of the electrolyte membrane 11 in the thickness direction thereof is higher than the ionic conductivity in the direction parallel to the surface of the membrane. The ionic conductivity is determined through an AC impedance method or the like. To be specific, electrical resistance is measured with varying distance between two electrodes (interelectrode distance). The interelectrode distance and the measured resistance are plotted and the effect of contact resistance is eliminated from the value of slope of the plot, to thereby obtain the ionic conductivity. Further, an anisotropy ratio of ionic conductivity γ of the electrolyte membrane 11 determined from the following equation (8) falls within a range of preferably more than 1, more preferably 2 or more and less than 60, and furthermore preferably 6 or more and less than 30. If the anisotropy ratio of ionic conductivity γ is 1 or less, the ionic conductivity of the electrolyte membrane 11 in the thickness direction is not sufficiently enhanced. In contrast, an anisotropy ratio of ionic conductivity γ of 60 or more causes difficulties in production of the electrolyte membrane 11.

Anisotropy ratio of ionic conductivity γ=(ionic conductivity in thickness direction)/(ionic conductivity in direction parallel to surface)   (8)

Next, a production method for the electrolyte membrane 11 is described as below. The production method involves a preparing step, a developing step, an orientating step, and a solidifying step. In the preparing step, the above-described components such as the liquid crystalline polymer are mixed to prepare a composition. In the preparing step, the components may be mixed at the same time. Alternatively, a liquid crystalline polymer may be bonded with an ionic dissociative group, and then other components may be mixed therein.

In the developing step, liquid crystallinity of the liquid crystalline polymer in the composition develops. In the developing step, when the liquid crystalline polymer is a thermotropic liquid crystalline polymer, the liquid crystalline polymer in the composition develops liquid crystallinity by heating and melting the composition. Meanwhile, when the liquid crystalline polymer is a lyotropic liquid crystalline polymer, the above-described solvent is added to the composition to prepare a solvent-containing composition. At this time, the lyotropic liquid crystalline polymer is dissolved in the solvent while the solvent-containing composition is heated, to thereby develop liquid crystallinity.

Concentration of the lyotropic liquid crystalline polymer in the solvent-containing composition is preferably 2 to 60 weight percent (weight percent). If the concentration of the lyotropic liquid crystalline polymer is less than 2 weight percent, the lyotropic liquid crystalline polymer barely develops liquid crystallinity because of low concentration thereof. In contrast, if the concentration of the lyotropic liquid crystalline polymer is more than 60 weight percent, a viscosity of the solvent-containing composition is increased, causing difficulties in orientation of molecular chains of the lyotropic liquid crystalline polymer in the orientating step.

Temperature of the solvent-containing composition is preferably 40 to $250°$ C., more preferably 40 to $200°$ C., and furthermore preferably 60 to $150°$ C. If the temperature of the solvent-containing composition is lower than $40°$ C. or higher than $250°$ C., the lyotropic liquid crystalline polymer cannot develop sufficient liquid crystallinity. A method for heating the solvent-containing composition is not particularly limited, and may involve use of radiant heat of an electrical heater, an infrared lamp, or the like; or a dielectric heating method. The solvent-containing composition is preferably heated in an inert gas atmosphere. The solvent-containing composition may be heated once to a temperature range in which no longer liquid crystallinity is not developed in order to transform the lyotropic liquid crystalline polymer into a uniform isotropic phase. And then the solvent-containing composition may be gradually cooled to a temperature range in which liquid crystallinity is developed. In this case, a liquid crystal phase of the lyotropic liquid crystalline polymer can be grown further compared with the case where the solvent-containing composition is only heated to a temperature range in which liquid crystallinity is developed.

Intrinsic viscosity of the solvent-containing composition is preferably 0.5 to 25 dl/g, more preferably 1 to 20 dl/g, and furthermore preferably 1 to 15 dl/g. Here, the intrinsic viscosity is measured at $25°$ C. by using methanesulfonic acid as a solvent and an Ostwald viscometer, in accordance with American Society for Testing Materials standard ASTM D2857-95. When an intrinsic viscosity of the solvent-containing composition is less than 0.5 dl/g, a lyotropic liquid crystalline polymer may have a low molecular weight in general, providing a brittle electrolyte membrane 11 with low strength. In contrast, an intrinsic viscosity thereof of more than 25 dl/g provides the solvent-containing composition with high viscosity, thereby causing difficulties with orientation of the molecular chains of the lyotropic liquid crystal in the orientating step.

In the orientating step, the molecular chains of the liquid crystalline polymer developing liquid crystallinity are orientated in a specific direction. Examples of a method for orientating the molecular chains of the liquid crystalline polymer in a specific direction include: a method involving self-orientation of the liquid crystalline polymer of the composition in a molten state or liquid state by using a solvent; and a method involving orientation of the liquid crystalline polymer by application of at least one field selected from a fluidized field, a shearing field, a magnetic field, and an electric field. Among the orientation methods, the method involving orientation by application of at least one field selected from a fluidized field, a shearing field, a magnetic field, and an electric field is preferable, and a method involving orientation by application of a magnetic field is more preferable.

In the method involving orientation by application of a magnetic field, a magnetic field is preferably applied to the composition by using a magnetic field generating device. At this time, the molecular chains of the liquid crystalline polymer are orientated in a direction parallel to a line of magnetic force. Specifically, after the developing step, a plurality of liquid crystalline polymer chains form an aggregate through liquid crystallization, in which the molecular chains extend in the same direction. Then, the aggregates of liquid crystalline polymer are orientated in a specific direction by application of a magnetic field. Examples of the magnetic field generating device include a permanent magnet, an electromagnet, a superconducting magnet, and a coil. Of those, the superconducting magnet is preferable because it can easily generate a magnetic field with a high magnetic flux density.

A magnetic flux density of the magnetic field applied to the composition is preferably 1 to 30 tesla (T), more preferably 2 to 25 T, and furthermore preferably 3 to 20 T. A magnetic flux density of less than 1 T inhibits sufficient orientation of the aggregates of the liquid crystalline polymer. In contrast, a magnetic flux density or more than 30 T is not practical. Note that, when the liquid crystalline polymer is a lyotropic liquid polymer, a magnetic field is applied to the solvent-containing composition.

In the solidifying step, the composition is solidified in a state in which the orientation of the molecular chains of the liquid crystalline polymer, that is, the orientation of the aggregates of the liquid crystalline polymer is maintained. In the solidifying step, when the liquid crystalline polymer is a thermotropic liquid crystalline polymer, the composition is solidified by cooling. Meanwhile, when the liquid crystalline polymer is a lyotropic liquid crystalline polymer, the composition may be solidified by heating the solvent-containing composition and removing the solvent, but the composition is preferably solidified (coagulated) by using a coagulating liquid. The coagulating liquid is a substance which is compatible with the solvent and which does not dissolve the lyotropic liquid crystalline polymer. Examples of the coagulating liquid include water, an aqueous solution of phosphoric acid, an aqueous solution of sulfuric acid, an aqueous solution of sodium hydroxide, methanol, ethanol, acetone, and ethylene glycol. One type of coagulating liquid may be used, or two or more types thereof may be used in combination.

When coagulating liquid is brought into contact with the solvent-containing composition, only the solvent is dissolved into the coagulating liquid and transfers from the solvent-containing composition into the coagulating liquid. As a result, the lyotropic liquid crystalline polymer precipitates, to thereby solidify the composition. Among the coagulating liquids, a 10 to 70 wt % aqueous solution of phosphoric acid, or lower alcohol such as methanol or ethanol is preferably used as the coagulating liquid, because the solvent is transferred gently into the coagulating liquid, enhancing the surface smoothness of a resultant electrolyte membrane 11.

Temperature of the coagulating liquid is preferably −60 to 60° C., more preferably −30 to 30° C., and furthermore preferably −20 to 0° C. If the temperature of the coagulating liquid is lower than −60° C., solidification of the composition may require a long period of time, which reduces the production efficiency of the electrolyte membrane 11. In contrast, if the temperature of the coagulating liquid is higher than 60° C., surface smoothness of the electrolyte membrane 11 may be degraded, or unevenness of the density of the lyotropic liquid crystalline polymer in the electrolyte membrane 11 may occur. In the solidifying step, the magnetic field is preferably applied to the composition in order to maintain the orientation of the liquid crystalline polymer aggregate.

After the solidifying step, the solidified composition is washed and dried. The washing of the solidified composition involves immersing the composition in a wash fluid, or spraying the composition with a wash fluid. A polar solvent such as water is used as a wash fluid. The solidified composition is dried through: a method using a heated gas such as air, nitrogen, or argon, a method involving radiant heat of an electrical heater, or an infrared lamp, and a dielectric heating method. At this time, the outer edge part of the solidified composition may be fixed to restrict shrinkage thereof. Drying temperature is preferably 100 to 500° C., more preferably 100 to 400° C., and furthermore preferably 100 to 200° C. A drying temperature of lower than 100° C. results in an insufficient dried composition. In contrast, a drying temperature of higher than 500° C. may cause decomposition of the liquid crystalline polymer. In the present invention, some of said steps such as the preparing step and the developing step may be performed at the same time, or the steps may be performed continuously.

Hereinafter, description is given of an example of a production method for the electrolyte membrane 11 from the composition containing a thermotropic liquid crystalline polymer as a liquid crystalline polymer.

Figure 4:
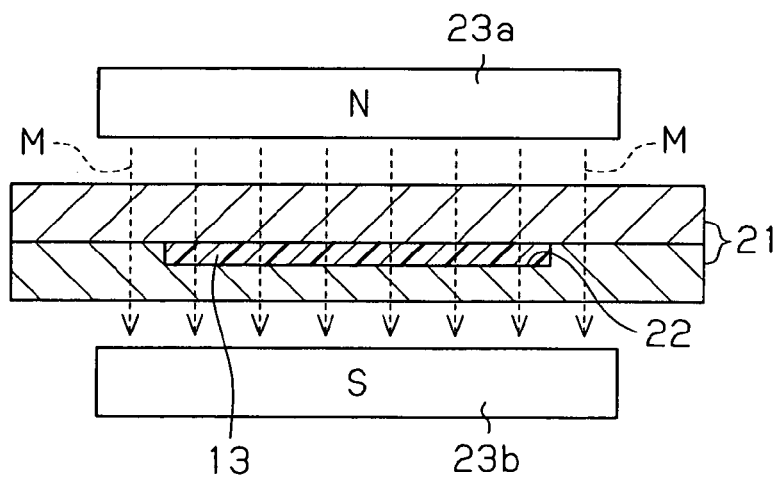
FIG. 4 is a schematic diagram showing a production process for an electrolyte membrane.

As shown in FIG. 4, a die 21 for producing the electrolyte membrane 11 includes a cavity 22 having a shape corresponding to the shape of the electrolyte membrane 11. The die 21 further includes a heating device (not shown).

First, in the preparing step and the developing step, a thermotropic liquid crystalline polymer having ionic dissociative groups and other components are mixed, to thereby prepare a composition. Next, the composition is heated and melted to develop liquid crystallinity of the thermotropic liquid crystalline polymer. Then, the heated and melted composition is filled into the cavity 22 of the die 21 to be molded into an intermediate membrane 13. The molding of composition is performed by using a heating molding machine for a synthetic resin material, such as an injection molding machine, an extruder, or a pressing machine. The intermediate membrane 13 is maintained in a molten state by the heating device provided in the die 21.

Next, in the orientating step, a pair of permanent magnets 23a and 23b are arranged above and below the die 21 such that an upper north pole and a lower south pole are disposed opposite one another, interpolating the die 21 therebetween. Lines of magnetic force M extend linearly between the upper permanent magnet 23a and the lower permanent magnet 23b. As a result, a magnetic field is applied to the intermediate membrane 13. At this time, aggregates of the thermotropic liquid crystalline polymer having ionic dissociative groups are orientated in a thickness direction (perpendicular direction) of the intermediate membrane 13 because the lines of magnetic force M extend in parallel with the thickness direction of the intermediate membrane 13.

Next, in the solidifying step, the die 21 is cooled in a state where the orientation of the thermotropic liquid crystalline polymer aggregate is maintained to solidify the intermediate membrane 13. Then, the intermediate membrane 13 is removed from the die 21, washed, and dried to obtain the electrolyte membrane 11.

Further, description is given of a production method for the electrolyte membrane 11 from the composition containing a lyotropic liquid crystalline polymer as a liquid crystalline polymer.

Figure 5:
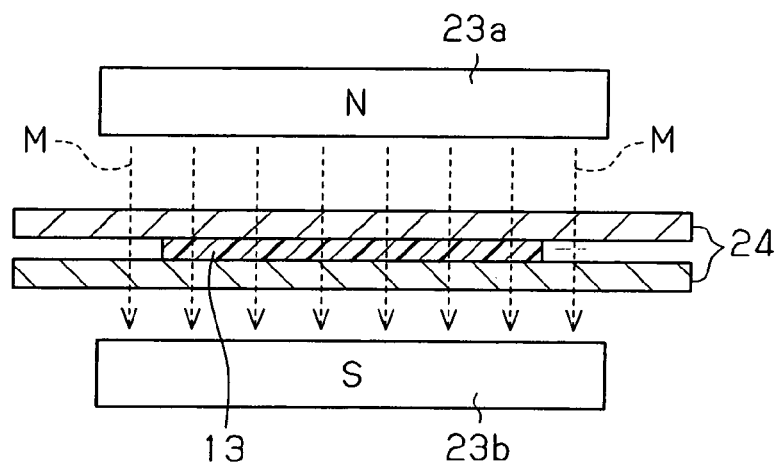
FIG. 5 is a schematic diagram showing another production process for an electrolyte membrane.

First, in the preparing step and the developing step, a lyotropic liquid crystalline polymer and other components are mixed to prepare a composition. Then, a solvent is added to the composition to prepare a solvent-containing composition. Next, as shown in FIG. 5, the solvent-containing composition is cast on a substrate 24 by using, for example, a slit die to form the intermediate membrane 13. Examples of the substrate 24 include an endless belt, an endless drum, an endless film, a sheet-like material, and an orientation membrane. Examples of the orientation membrane include a rubbing membrane formed through rubbing of polyimide or the like, and an optical orientation membrane orientated through irradiation of a compound containing a functional group having optical reactivity with polarized ultraviolet rays or the like. In a case where the orientating step involves self-orientation of the liquid crystalline polymer, aggregates of the liquid crystalline polymer can be orientated by using a surface feature of the orientation membrane. The substrate 24 may be formed of a material such as glass, a synthetic resin material, or a metallic material, but is preferably formed of a corrosion resistant material such as stainless steel, a hastelloy-based alloy, or tantalum.

Next, another substrate 24 is placed on the intermediate membrane 13 to sandwich the intermediate membrane 13 between a pair of substrates 24. The intermediate membrane 13 sandwiched by the pair of substrates 24 has reduced contact area with moisture in air, and thus degradation of the intermediate membrane 13 by air may by suppressed. If the intermediate membrane 13 is not sandwiched by the pair of substrates 24, the intermediate membrane 13 is preferably placed in a dry air atmosphere to prevent degradation by moisture in air.

Next, in the orientating step, a pair of permanent magnets 23a and 23b are arranged above and below the substrates 24 such that an upper north pole and a lower south pole sandwiching the substrates 24 in opposite. Lines of magnetic force M extends linearly between the upper permanent magnet 23a and the lower permanent magnet 23b. As a result, a magnetic field is applied to the intermediate membrane 13. At this time, aggregates of the lyotropic liquid crystal having an ionic dissociative group are orientated in the thickness direction (perpendicular direction) of the intermediate membrane 13 because the line of magnetic force M extends in parallel with the thickness direction of the intermediate membrane 13. A heating device (not shown) is provided in a vicinity of each of the substrates 24, and the intermediate membrane 13 is maintained within a temperature range in which the intermediate membrane 13 develops liquid crystallinity.

Next, in the solidifying step, the intermediate membrane 13 is peeled off from each of the substrates 24 while the lyotropic liquid crystalline polymer aggregates are maintained in an orientated state. Then, the solvent-containing composition is heated, and the solvent is removed to solidify the intermediate membrane 13. The intermediate membrane 13 is washed and dried to obtain the electrolyte membrane 11.

The embodiments above-described have the following advantages.

The electrolyte membrane 11 according to the embodiment of the present invention is formed of a composition containing a liquid crystalline polymer having ionic dissociative groups. The electrolyte membrane 11 has orientated molecular chains of the liquid crystalline polymer, specifically, orientated aggregates of liquid crystalline polymer in a specific direction. The degree of orientation α of the liquid crystalline polymer in the specific direction is set within a range of 0.45 or more and less than 1. In addition, the electrolyte membrane 11 is structured to have higher ionic conductivity along the thickness direction of the membrane than the ionic conductivity in a direction parallel to a surface of the membrane.

In this way, the electrolyte membrane 11 has a high ionic conductivity due to the ionic dissociative group, to thereby provide excellent ion conduction. In the electrolyte membrane 11, the degree of orientation α and an ionic conductivity along the thickness direction within the above ranges provide higher ionic conductivity in the thickness direction than the ionic conductivity in a direction parallel to the surface to particularly enhance ion conduction properties in the thickness direction. In addition, the electrolyte membrane 11 has excellent thermal resistance, because it is formed of a composition containing a liquid crystalline polymer. Thus, the electrolyte membrane 11 is capable of preventing significant reduction in moisture retention and ionic conductivity, and preventing heat deformation, even if the ambient temperature increases from normal temperature to 100° C. Further, liquid crystalline polymers tend to be densely arranged on the surface or inside the electrolyte membrane 11. Thus pores are barely formed on/in the electrolyte membrane 11 compared with a conventional electrolyte membrane. In this way, the electrolyte membrane 11 is configured to suppress permeation of a fuel therethrough and to allow efficient permeation of hydrogen ions in a thickness direction. Thus, the electrolyte membrane 11 of the present invention is more suitable for a solid polymer type fuel cell in comparison with the conventional electrolyte membrane.

According to the production method of the embodiment, the electrolyte membrane 11 is produced from the composition through the steps above-described. An ion conductive polymer electrolyte membrane disclosed in Japanese Laid-Open Paten Publication No. 2003-234015 uses a crystalline polymer or a non-crystalline polymer. A plurality of the polymers are each orientated by application of an electric field without formation of aggregates. Thus, a crystalline site of the polymer is orientated easily, but an amorphous site is barely orientated. As a result, all molecules of the polymer are barely orientated in a specific direction. In contrast, according to the embodiment of the present invention, the aggregates of the liquid crystalline polymer are orientated easily by, for example, application of a magnetic field. This facilitates to entirely orientate the polymer molecules compared with a case of the conventional polymers. Thus, the production method from the electrolyte membrane 11 according to the embodiment of the present invention allows easy production of the electrolyte membrane 11 compared with the production method for the conventional electrolyte membrane.

In the electrolyte membrane 11, the liquid crystalline polymer develops liquid crystallinity in the developing step, and then the aggregates of the liquid crystalline polymer are orientated in a specific direction through the orientating step. This allows easy control of the degree of orientation α and ionic conductivity within the above ranges.

The liquid crystalline polymer is preferably polybenzazole, that is, one selected from polybenzoxazole, polybenzimidazole, and polybenzothiazole. In this case, the electrolyte membrane 11 may have not only high thermal resistance, but also high chemical resistance. This may prevent reduction of ionic conductivity even when it is used in an acidic atmosphere, for example.

Application of at least one field selected from a fluidized field, a shearing field, a magnetic field, and an electric field is preferable for orientating aggregates of the liquid crystalline polymer. Application of a magnetic field is especially preferable. In this case, an orientation direction of aggregates of the liquid crystalline polymer can be controlled easily.

In the method of orientating the aggregates by self-orientation, a liquid crystalline polymer to be used has a homeotropic orientation or a homogeneous orientation. In a homeotropic orientation, a longitudinal direction of the aggregate is spontaneously orientated in a direction perpendicular to a surface of the substrate 24. In a homogeneous orientation, a longitudinal direction of the aggregate is spontaneously orientated in a direction parallel to the surface of the substrate 24. This liquid crystalline polymer can be orientated in an arbitrary direction by controlling a structure of the intermediate membrane 13; and controlling surface free energy on the surface of the substrate 24 or at an interface with air. In this way, the method involving self-orientation allows orientation of the longitudinal direction of the aggregate of the liquid crystalline polymer in an arbitrary specific direction, to thereby provide a higher ionic conductivity in a thickness direction than the ionic conductivity in a direction parallel to the surface. However, control of orientation is more difficult than that in the method involving orientation by application of a field such as a magnetic field.

In the method of orientating the aggregate by application of an electric field, application of a voltage in an arbitrary direction while an electric field is applied is not easy. Further, interelectrode distance must be reduced for application of a higher voltage. Thus, the electric field can be easily applied to the intermediate membrane 13 in the thickness direction, but the electric field is barely applied to the intermediate membrane 13 in a direction parallel to the surface. Further, in application of an electric field to the solvent-containing composition, ionic dissociative groups may be attracted to electrodes, thereby causing difficulties in orientation of the liquid crystalline polymer.

In contrast, in the method of orientating the aggregate by application of a magnetic field, lines of magnetic force applied to the intermediate membrane 13 are barely attenuated even when space between the permanent magnets 23a and 23b used for application of a magnetic field is expanded. Further, use of superconducting magnets easily generate a high magnetic field in any space. Thus, space provided with a magnetic field may easily be expanded compared with space between electrodes provided with an electric field. Application direction of the magnetic field can be arbitrarily and easily controlled. Further, the magnetic field can uniformly be applied to the intermediate membrane 13 regardless of the thickness thereof. This can provide flexibility in an arrangement of manufacturing devices. For example, a heating device can be disposed above or below the substrate 24 to easily remove the solvent to produce a thick electrolyte membrane 11.

It should be apparent to those skilled in the art that the present invention can be embodied in many other specific forms without departing from the spirit or scope of the invention. Particularly, it should be understood that the invention may be embodied in the following forms.

After the preparing step, a substrate formed of an inorganic substance (such as porous glass) or a porous polymer may be impregnated with the composition prior to the orientating step. This can enhance the strength of the electrolyte membrane 11. The substrate preferably has pores formed extending in the thickness direction to allow easy orientation of aggregates of the liquid crystalline polymer in the composition filled into the pores in the thickness direction. For orientation of the aggregates in a direction parallel to the surface, a shearing field such as a rubbing field, or fluidized field may be used.

One of the permanent magnets 23a and 23b may be omitted. The permanent magnets 23a and 23b may be arranged such that the respective south poles or respective north poles face each other. Further, the line of magnetic force may be curved.

The upper substrate of the two substrates 24 sandwiching the intermediate membrane 13 may be omitted.

The electrolyte membrane 11 may be produced from a composition containing a thermotropic liquid crystalline polymer by using the substrate 24. The electrolyte membrane 11 may be produced from a composition containing a lyotropic liquid crystalline polymer by using the die 21.

The liquid crystalline polymer having ionic dissociative groups may be produced through polymerization of a liquid crystal monomer having ionic dissociative groups.

Orientation of the liquid crystalline polymer aggregate by application of a fluidized field or a shearing field may involve molding a block of the aggregate orientated in an arbitrary specific direction by using a molding machine such as an injection molding machine, an extruder, or a pressing machine in the orientating step and the solidifying step. And then the block is sliced to produce the electrolyte membrane 11. At this time, the block is sliced such that the resultant electrolyte membrane 11 has the largest ionic conductivity in the thickness direction thereof. A method of slicing the block may involve use of a rotary knife (such as a diamond cutter), a planing and molding machine, a water ablation cutter, a wire cutter, or the like.

The intermediate membrane 13 may be formed through a method such as compression molding, extrusion molding, injection molding, cast molding, calendar molding, painting, printing, dispensing, or potting.

The electrolyte membrane 11 may be used in various applications such as batteries other than solid polymer type fuel cells such as lithium ion secondary batteries (polymer batteries), sea water electrolysis, and ion conductive actuators, in which an electrolyte membrane having conductivity of protons such as hydrogen ions is preferably used.

EXAMPLES

Next, the embodiments of the present invention will be described in more detail with reference to examples and comparative examples.

Example 1

In a preparing step and a developing step of Example 1, 39.06 g of polyphosphoric acid (condensation rate of $P_2O_5$: 115%), 11.52 g of phosphorus pentoxide, 6.39 g (30.0 mmol) of 4,6-diaminoresorcinol dihydrochloride, and 8.05 g (30.0 mmol) of 2-sulfoterephthalic acid were filled into a reaction vessel equipped with a stirrer, a nitrogen introducing pipe, and a drier to prepare a reaction solution. The reaction solution was stirred at 70° C. for 0.5 hour in a nitrogen atmosphere. The reaction solution was gradually heated with stirring on the order of at 120° C. for 3 hours, at 130° C. for 10 hours, at 165° C. for 10 hours, and at 190° C. for 15 hours to obtain a crude sulfonated polybenzoxazole solution. Observation by using a polarizing microscope confirmed that the crude sulfonated polybenzoxazole solution exhibited optical anisotropy.

Next, the crude polybenzoxazole solution was washed with methanol, acetone, and water in the order given to convert into a neutral solution, which is confirmed by using a pH test paper, to obtain sulfonated polybenzoxazole (SPBO) as a lyotropic liquid crystalline polymer having ionic dissociative groups. Polyphosphoric acid was added to SPBO to prepare a 25 weight percent SPBO solution as a solvent-containing composition.

The 25 weight percent SPBO solution was applied between the two substrates 24 to obtain a film-like intermediate membrane 13. Next, in the orientating step, the substrates 24 were placed in a magnetic field generated by superconducting magnets. At this time, lines of magnetic force M were parallel with a thickness direction of the intermediate membrane 13. The intermediate membrane 13 was heated at 100° C. for 25 minutes while a magnetic field of 5 T was applied thereto. In the solidifying step, the intermediate membrane 13 was left standing to be naturally cooled to room temperature (25° C.) for solidification. Then, the intermediate membrane 13 sandwiched between the substrates 24 was immersed in a mixed solution (coagulating liquid) of methanol and water. In the mixed solution, one of the substrates 24 was removed, and the intermediate membrane 13 was further solidified. The solidified intermediate membrane 13 was immersed in the mixed solution for additional 1 hour, in water for 1 hour, and dried at 110° C. for 2 hours to obtain an SPBO membrane as the electrolyte membrane 11.

Example 2

In Example 2, an SPBO membrane was obtained in the same manner as in Example 1 except a magnetic flux density applied to the intermediate membrane 13 was changed to the value shown in Table 4.

Example 3

In the preparing step and developing step, 6.41 g of polybenzimidazole dissolved in 1-methyl-2-pyrrolidinone was added with 0.6 g of lithium hydride to prepare a reaction solution. The reaction solution was stirred at 70° C. for 12 hours while heating. Next, 5.07 g of 3-propanesultone was dropped into the reaction solution, which was stirred at 70° C. for additional 12 hours. The reaction solution was re-precipitated using acetone to obtain sulfonated polybenzimidazole (SPBI) as a lyotropic liquid polymer having ionic dissociative groups. Then, SPBI was dissolved in 1-methyl-2-pyrrolidinone to obtain a 30 weight percent SPBI solution as a solvent-containing composition. Observation by using a polarizing microscope confirmed that the 30 weight percent SPBI solution exhibited optical anisotropy.

Then, the 30 weight percent SPBI solution was applied to the substrate 24 to obtain a film-like intermediate membrane 13. Next, in the orientating step, the substrate 24 was placed in a magnetic field generated by superconducting magnets. At this time, lines of magnetic force M were parallel with a thickness direction of the intermediate membrane 13. The intermediate membrane 13 was heated at 100° C. for 25 minutes while a magnetic field of 10 T was applied thereto. In the solidifying step, the intermediate membrane 13 was naturally cooled to room temperature for solidification. Then, the intermediate membrane 13 was dried under vacuum to obtain an SPBI membrane as the electrolyte membrane 11.

Example 4

In the preparing step and developing step, a mixture of SPBO of Example 1 and SPBI of Example 3 was dissolved in polyphosphoric acid to prepare an SPBO/SPBI mixed solution (mixture concentration: 30 weight percent) as a solvent-containing composition. A mass ratio of SPBO to SPBI in the mixture was 7:3. Observation by using a polarizing microscope confirmed that the SPBO/SPBI mixed solution exhibited optical anisotropy.

Then, the SPBO/SPBI mixed solution was applied between the two substrates 24, to thereby obtain a film-like intermediate membrane 13. Next, in the orientating step, the substrates 24 were placed in a magnetic field generated by superconducting magnets. At this time, such that lines of magnetic force M were parallel with the thickness direction of the intermediate membrane 13. The intermediate membrane 13 was heated at 100° C. for 25 minutes while a magnetic field of 10 T was applied thereto. Then, an SPBO/SPBI mixture membrane as the electrolyte membrane 11 was obtained in the same manner as in Example 1.

Example 5

In the preparing step and the developing step of Example 5, polybenzimidazole (PBI) was dissolved in 1-methyl-2-pyrrolidinone to prepare a 35 weight percent PBI solution as a solvent-containing composition. Observation by using a polarizing microscope confirmed that the 35 weight percent PBI solution exhibited optical anisotropy. Then, the 35 weight percent PBI solution was applied to the substrate 24 to obtain a film-like intermediate membrane 13. Subsequently, a PBI membrane as the electrolyte membrane 11 was obtained in the same manner as in Example 3.

Example 6

In the preparing step and developing step, 9.3 g (186.3 mmol) of hydrazine monohydrate, 41.4 ml of ethanol, 50.6 g (372.6 mmol) of 4-hydroxyacetophenone, and about 0.01 ml of hydrochloric acid were put into a reaction vessel equipped with a stirrer to prepare a reaction solution. The reaction solution was refluxed for 6 hours. Then, the reaction solution was dissolved in an aqueous ethanol solution and was left standing overnight for precipitation. The precipitated 4'-dihydroxy-α,α'-dimethylbenzalazine was filtered and separated. Next, 12.34 g (46 mmol) of 4,4'-dihydroxy-α,α'-dimethylbenzalazine, 2.49 g (4 mmol) of Brilliant Yellow, 600 mg of sodium hydroxide, and 1.2 g of butyltriethylammonium chloride were dissolved in 800 ml of distilled water to thereby prepare a first mixed solution. Then, a second mixed liquid prepared by dissolving 1.05 g (5.2 mmol) of terephthaloyl dichloride and 11.2 g (46.8 mmol) of sebacoyl dichloride in 500 ml of dichloromethane was added to the first mixed solution, and the whole was stirred. About 200 ml of methanol was added to the mixed solution, and the whole was stirred for several minutes, and then filtered and separated to obtain a sulfonated thermotropic liquid crystalline polymer (SLCP) as a thermotropic liquid crystalline polymer having ionic dissociative groups. Then, SLCP was subjected to press molding, to produce a sheet-like intermediate membrane 13 of 20 mm in length×20 mm in width×0.1 mm in thickness.

Next, in the orientating step, the intermediate membrane 13 was placed in the cavity 22 of the die 21 heated to 190° C. The intermediate membrane 13 was melted in a magnetic field with a magnetic flux density of 10 T by superconducting magnets. The melted intermediate membrane 13 was maintained in the same magnetic field for 20 minutes while a pressure of 3.9 MPa was applied to the die 21. In the solidifying step, the intermediate membrane 13 was cooled to room temperature for solidification to obtain an SLCP membrane as the electrolyte membrane 11.

Comparative Examples 1 to 5

In Comparative Example 1, an SPBO membrane was obtained in the same manner as in Example 1 except that no magnetic field was applied. In Comparative Example 2, an SPBI membrane was obtained in the same manner as in Example 3 except that no magnetic field was applied. In Comparative Example 3, an SPBO/SPBI mixture membrane was obtained in the same manner as in Example 4 except that no magnetic field was applied. In Comparative Example 4, a PBI membrane was obtained in the same manner as in Example 5 except that no magnetic field was applied. In Comparative Example 5, an SLCP membrane was obtained in the same manner as in Example 6 except that no magnetic field was applied.

Comparative Example 6

In Comparative Example 6, a 5 weight percent solution of perfluorocarbon sulfonic acid (5 weight percent NAFION (trade name) solution, available from DuPont) was applied to the substrate 24 to form a film. The whole substrate was dried at 120° C. for 30 minutes, and the solvent was removed, to thereby obtain a perfluorocarbon sulfonic acid (PFCS) membrane.

Comparative Example 7

In Comparative Example 7, the same solution was applied to the substrates 24 in the same manner as in Comparative Example 6. The substrates 24 were placed in a magnetic field by using the superconducting magnets. The intermediate membrane 13 was heated at 120° C. for 30 minutes while a magnetic field of 10 T was applied thereto, to thereby obtain a PFCS membrane.

Figure 6:
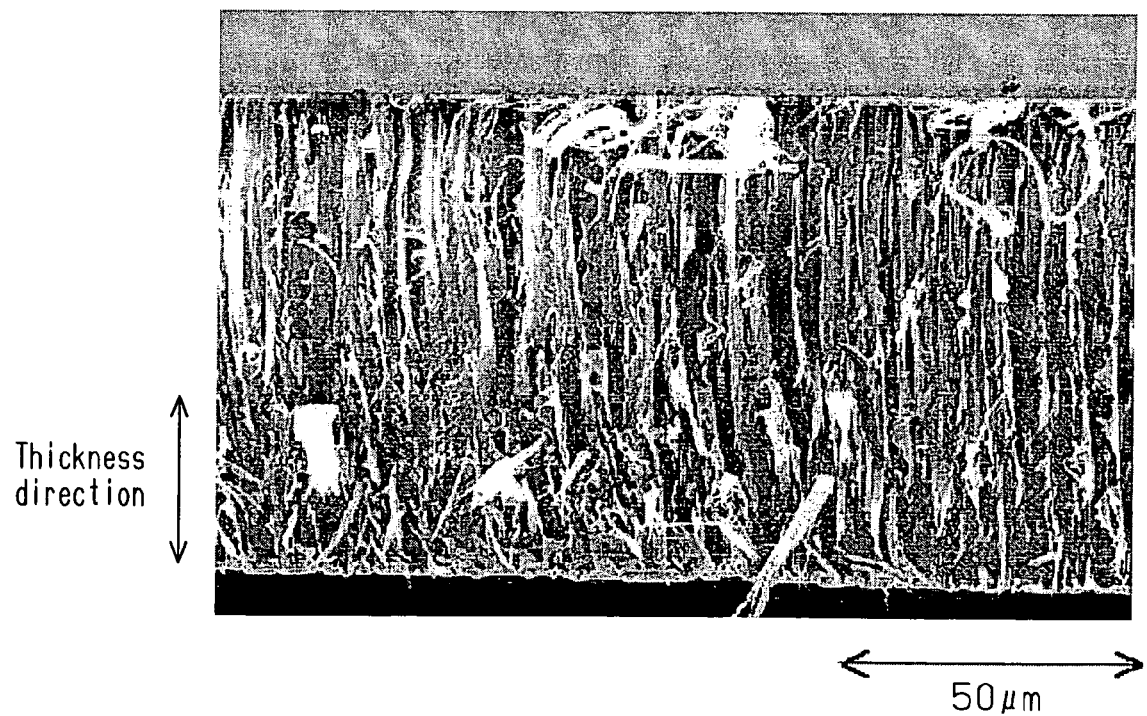
FIG. 6 is a diagram showing an electron microscope photograph of Example 2.
Figure 7:
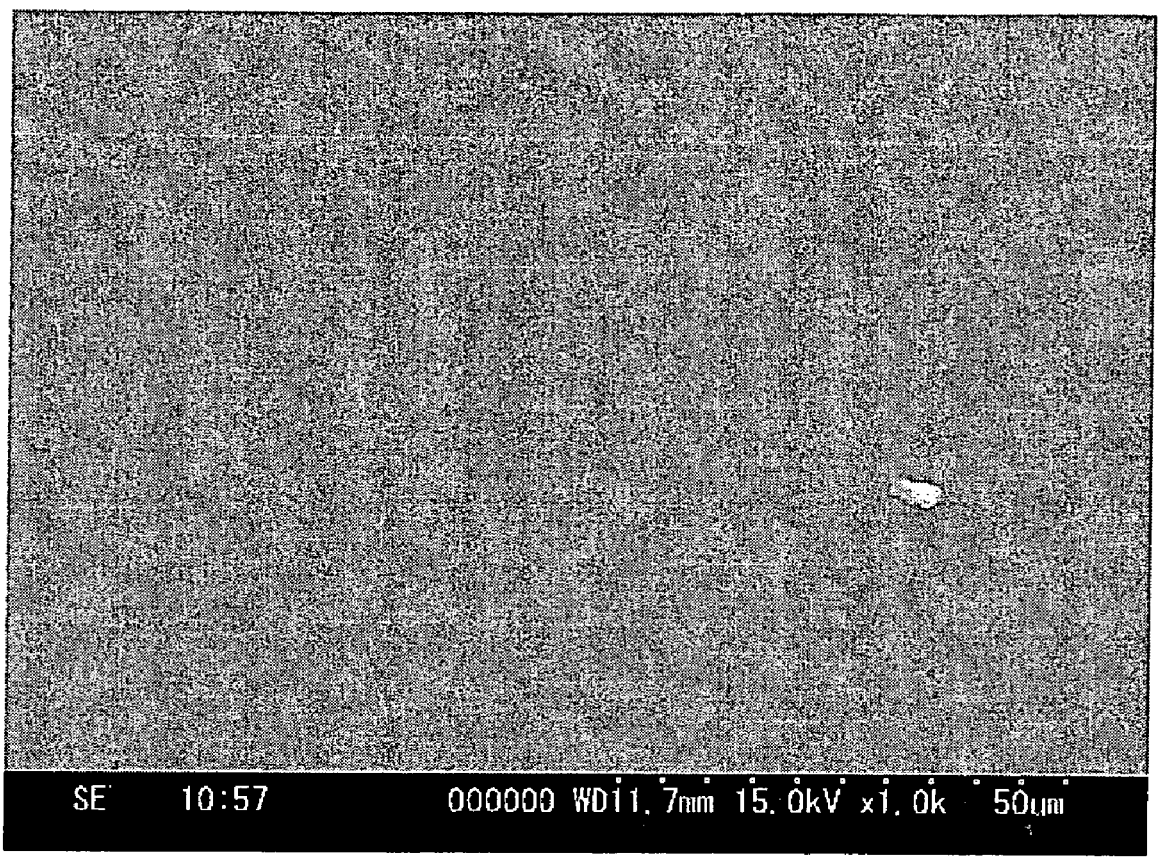
FIG. 7 is a diagram showing another electron microscope photograph of Example 2.

Three types of electrolyte membranes 11 each having a thickness of 25 μm, 50 μm, or 100 μm were produced in each of Examples 1 to 5 and Comparative Examples 1 to 7. The electrolyte membrane 11 of each example was measured regarding the following items. Also the electrolyte membrane 11 in each of Examples 1 to 5 and Comparative Examples 1 to 4 was measured for intrinsic viscosity. Tables 4 and 5 show the results. The section in the thickness direction and surface of the electrolyte membrane 11 of each example was observed by using an electron microscope. FIG. 6 shows an electron microscope photograph of a section in the thickness direction of the electrolyte membrane 11 of Example 2, and FIG. 7 shows an electron microscope photograph of t surface thereof.

<Degree of Orientation α>

As for each electrolyte membrane, an X-ray diffraction intensity distribution pattern in the direction of azimuthal angle was obtained by irradiating X-rays onto the membrane from an X-axis direction in FIG. 1 by using an X-ray diffractometer (RINT-RAPID, manufactured by Rigaku Corporation). The degree of orientation α was calculated from the equation (1) based on a full width at half maximum Δβ of the peak which appears at about 2θ=15 to 25° in the X-ray diffraction intensity distribution pattern.

<Ionic Conductivity and Anisotropy Ratio of Ionic Conductivity>

The electrolyte membrane 11 having each thickness (25 μm, 50 μm, or 100 μm) of each example was cut out into a specific shape. Each cut out electrolyte membrane 11 was sandwiched by sheet-like platinum probes (10 mm×10 mm), and the whole structure was left standing in an atmosphere of 80° C. and 90% RH. AC impedance was measured by using an impedance analyzer. Then the obtained measurement result was extrapolated into a Cole-Cole plot, to thereby obtain resistance. Interelectrode distance (thickness of the electrolyte membrane 11 during measurement) and the measured resistance were plotted. The effect of contact resistance generated between the electrolyte membrane 11 and the platinum probe was eliminated from the value of the slope of the plot obtained, to thereby obtain ionic conductivity in the thickness direction of the electrolyte membrane 11. The ionic conductivity in a direction parallel to the surface of the electrolyte membrane 11 was measured in the same manners as that in a thickness direction, except that distance between the platinum probes was changed by pressing the platinum probe against the surface of the electrolyte membrane 11 having a specific thickness (25 μm). Then, an anisotropy ratio of ionic conductivity was calculated from the equation (8) by using the ionic conductivity in the thickness direction and that in a direction parallel to the surface.

<Intrinsic Viscosity>

The composition was dissolved in methanesulfonic acid, and then an intrinsic viscosity of the solution of the composition was measured at 25° C. by using an Ostwald viscometer. Note that, concentration of the composition was 0.05 g/dL.

TABLE 4

| | Examples | | | | | |
|---|---|---|---|---|---|---|
| | 1 | 2 | 3 | 4 | 5 | 6 |
| SPBO (weight %) | 100 | 100 | 0 | 70 | 0 | 0 |
| SPBI (weight %) | 0 | 0 | 100 | 30 | 0 | 0 |
| PBI (weight %) | 0 | 0 | 0 | 0 | 100 | 0 |
| SLCP (weight %) | 0 | 0 | 0 | 0 | 0 | 100 |
| Magnetic flux density (T) | 5 | 10 | 10 | 10 | 10 | 10 |
| Degree of orientation α | 0.59 | 0.87 | 0.87 | 0.45 | 0.80 | 0.77 |
| Ionic conductivity in the thickness direction (S/cm) | 0.21 | 0.65 | 0.09 | 0.09 | 0.001 | 0.0020 |
| Ionic conductivity in a direction parallel to surface (S/cm) | 0.09 | 0.04 | 0.01 | 0.01 | 0.0002 | 0.0003 |
| Anisotropy ratio of ionic conductivity | 2.3 | 15 | 9.0 | 9.0 | 5.0 | 6.7 |
| Intrinsic viscosity (dl/g) | 1.6 | 1.6 | 1.3 | 1.5 | 2.0 | — |

TABLE 5

|  | Comparative Examples | | | | | | |
|---|---|---|---|---|---|---|---|
|  | 1 | 2 | 3 | 4 | 5 | 6 | 7 |
| SPBO (weight %) | 100 | 0 | 70 | 0 | 0 | 0 | 0 |
| SPBI (weight %) | 0 | 100 | 30 | 0 | 0 | 0 | 0 |
| PBI (weight %) | 0 | 0 | 0 | 100 | 0 | 0 | 0 |
| SLCP (weight %) | 0 | 0 | 0 | 0 | 100 | 0 | 0 |
| PFCS (weight %) | 0 | 0 | 0 | 0 | 0 | 100 | 100 |
| Magnetic flux density(T) | 0 | 0 | 0 | 0 | 0 | 0 | 10 |
| Degree of orientation α | 0.37 | 0.43 | 0.38 | 0.44 | 0.44 | 0.38 | 0.40 |
| Ionic conductivity in the thickness direction(S/cm) | 0.10 | 0.018 | 0.05 | 0.00016 | 0.0005 | 0.10 | 0.10 |
| Ionic conductivity in a direction parallel to surface (S/cm) | 0.15 | 0.023 | 0.07 | 0.00025 | 0.0006 | 0.12 | 0.11 |
| Anisotropy ratio of ionic conductivity | 0.7 | 0.8 | 0.7 | 0.6 | 0.8 | 0.83 | 0.91 |
| Intrinsic viscosity (dl/g) | 1.6 | 1.3 | 1.5 | 2.0 | — | — | — |

As shown in Table 4, excellent results were obtained for each measurement for Examples 1 to 6. Thus, the electrolyte membrane 11 of each of the Examples had improved ionic conductivity, in particular, improved ionic conductivity in a thickness direction. Further, as shown in FIGS. 6 and 7, the electrolyte membrane 11 of Example 2 had no porous structure with pores formed on the surface or inside thereof. The electrolyte membrane 11 of each of Examples 1 and 3 to 6 had no pores formed on the surface or inside thereof similar to that of Example 2 (not shown).

The present examples and embodiments are to be considered as illustrative and not restrictive and the invention is not to be limited to the details given herein, but may be modified within the scope and equivalence of the appended claims.

The invention claimed is:

1. A method for manufacturing an electrolyte membrane formed of an ion conductive composition containing a lyotropic liquid crystalline polymer having an ionic dissociative group and molecular chains orientated in a specific direction in which a degree of orientation α of the liquid crystalline polymer is in a range of 0.45 or more and less than 1, as defined by an equation (1) as follows:

Degree of orientation α=(180−Δβ)/180 (1)

wherein Δβ is a full width at half maximum of a peak in an X-ray diffraction intensity distribution pattern obtained by measuring an intensity distribution from 0 to 360 degrees in the azimuthal angle direction, at a peak scattering angle, in an X-ray diffraction image of the electrolyte membrane; and wherein an anisotropy ratio of ionic conductivity of the membrane determined from equation (2) below falls within a range of more than 1 and less than 60, anisotropy ratio of ionic conductivity γ=(ionic conductivity in thickness direction)/(ionic conductivity in direction parallel to surface) (2), the method comprising:

preparing the ion conductive composition containing the lyotropic liquid crystalline polymer having an ionic dissociative group and a solvent, each molecular chain including a main chain and the ionic dissociative group being bonded to the main chain;

developing liquid crystallinity of the liquid crystalline polymer in the composition, wherein said developing includes heating the composition once to a temperature range in which liquid crystallinity is not developed in order to transform the lyotropic liquid crystalline polymer into a uniform isotropic phase and then cooling the composition to a temperature range in which liquid crystallinity is developed;

orientating the molecular chains of the lyotropic liquid crystalline polymer having developed liquid crystallinity, in a thickness direction of the membrane; and solidifying the ion conductive composition while the orientation of the molecular chains of the liquid crystalline polymer is maintained.

2. The method for manufacturing an electrolyte membrane according to claim 1, wherein said orientating includes applying a magnetic field to the ion conductive composition for orientating the molecular chains of the lyotropic liquid crystalline polymer in the specific direction.

3. The method for manufacturing an electrolyte membrane according to claim 1, wherein the lyotropic liquid crystalline polymer includes at least one substance selected from the group consisting of polybenzoxazole, polybenzothiazole, and polybenzimidazole.

4. The method for manufacturing an electrolyte membrane according to claim 1, wherein said solidifying includes contacting the ion conductive composition with a coagulating liquid that is compatible with the solvent and does not dissolve the lyotropic liquid crystalline polymer.

5. The method for manufacturing an electrolyte membrane according to claim 1, wherein the anisotropy ratio of ionic conductivity of the membrane is in a range between 2.3 and 15, inclusive.

* * * * *